(12) United States Patent
Fischbach et al.

(10) Patent No.: US 7,815,833 B2
(45) Date of Patent: Oct. 19, 2010

(54) METHOD FOR PRODUCING INJECTION-MOLDED PARTS

(75) Inventors: Gunther Fischbach, München (DE);
Jens Liebhold, Burgdorf (DE); Markus Berndt, Wennigsen (DE); Rainer Zimmet, Neckarwestheim (DE);
Matthias Sieverding, Newton, NC (US)

(73) Assignees: KraussMaffei Technologies GmbH, München (DE); KraussMaffei Berstorff GmbH, Hannover (DE)

( * ) Notice: Subject to any disclaimer, the term of this patent is extended or adjusted under 35 U.S.C. 154(b) by 0 days.

(21) Appl. No.: 12/252,768

(22) Filed: Oct. 16, 2008

(65) Prior Publication Data

US 2009/0051070 A1    Feb. 26, 2009

Related U.S. Application Data

(63) Continuation of application No. 11/679,528, filed on Feb. 27, 2007, now abandoned, which is a continuation of application No. PCT/EP2005/052870, filed on Jun. 21, 2005.

(30) Foreign Application Priority Data

Aug. 27, 2004   (DE)   ........................ 10 2004 041 689

(51) Int. Cl.
*B29C 45/46* (2006.01)
*B29C 47/50* (2006.01)
(52) U.S. Cl. .............................. 264/211.23; 264/328.19
(58) Field of Classification Search ........................ None
See application file for complete search history.

(56) References Cited

U.S. PATENT DOCUMENTS

| 3,992,500 | A | * | 11/1976 | Kruder et al. ................ 264/102 |
| 4,029,300 | A | | 6/1977 | Morishima et al. |
| 4,110,844 | A | | 8/1978 | Nakamura |
| 4,663,103 | A | * | 5/1987 | McCullough et al. ...... 264/40.4 |
| 4,667,852 | A | * | 5/1987 | Siemann ....................... 222/54 |
| 4,877,390 | A | | 10/1989 | Ocker et al. |
| 4,902,455 | A | | 2/1990 | Wobbe |
| 5,316,712 | A | * | 5/1994 | Ono et al. .................... 264/102 |
| 5,968,429 | A | | 10/1999 | Treece et al. |
| 2003/0075821 | A1 | | 4/2003 | Zimmet et al. |

FOREIGN PATENT DOCUMENTS

| EP | 0 538 286 | 4/1993 |
| EP | 1 226 922 A1 | 7/2002 |
| ES | 2 067 941 | 4/1993 |
| JP | 2001 018223 | 1/2001 |
| WO | WO 86/06321 | 11/1986 |
| WO | WO 92/00838 | 1/1992 |
| WO | WO 00/58072 | 10/2000 |
| WO | WO 01/43943 | 6/2001 |

* cited by examiner

*Primary Examiner*—Monica A Huson
(74) *Attorney, Agent, or Firm*—Henry M. Feiereisen; Ursula B. Day

(57) ABSTRACT

In a method for producing injection-molded parts, PET material is processed and/or plasticized by means of a twin-screw extruder having a plurality of processing zones. At least two processing zones are implemented as degassing zones. The processed and/or plasticized material is transferred to a transfer reservoir and then further processed by a piston unit.

19 Claims, 1 Drawing Sheet

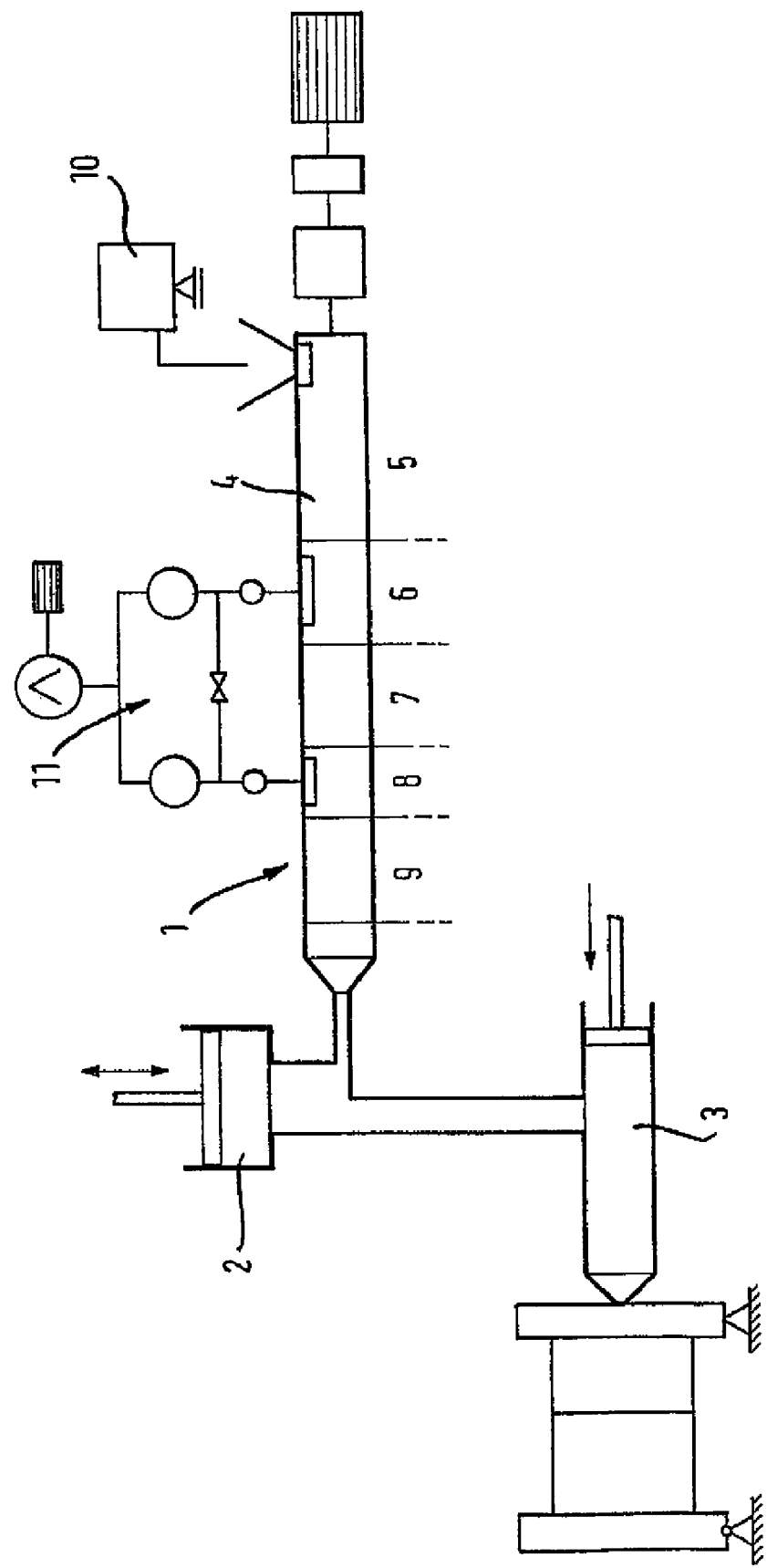

METHOD FOR PRODUCING INJECTION-MOLDED PARTS

CROSS-REFERENCES TO RELATED APPLICATIONS

This application is a continuation of prior filed copending U.S. application Ser. No. 11/679,528, filed Feb. 27, 2007, the priority of which is hereby claimed under 35 U.S.C. §120, and which is a continuation of prior filed copending PCT International application no. PCT/EP2005/052870, filed Jun. 21, 2005, which designated the United States and has been published but not in English as International Publication No. WO 20061024553 A1 and on which priority is claimed under 35 U.S.C. §120, and which claims the priority of German Patent Application, Serial No. 10 2004 041 689.3, filed Aug. 27, 2004, pursuant to 35 U.S.C. 119(a)-(d).

The contents of U.S. application Ser. No. 11/679,528, PCT International Application No. PCT/EP2005/052870, and German Patent Application, Serial No. 10 2004 041 689.3 are incorporated herein by reference in its entirety as if fully set forth herein.

BACKGROUND OF THE INVENTION

The invention relates, in general, to a method for producing injection-molded parts, in particular PET preforms.

Nothing in the following discussion of the state of the art is to be construed as an admission of prior art.

An apparatus for producing injection-molded parts, in particular PET preforms, typically includes an extruder for processing and/or plasticizing material that is normally present in granular form. A transfer reservoir receives processed and/or plasticized material, and a piston unit is provided for further processing the material. Normally, the production of PET preforms using an injection molding process involves the application of a single screw extruder for plasticizing materials, such as plastic pellets. For subsequent processing, the plasticized material is injection-molded with a piston unit—shot pot—or directly injected with an axially movable screw. Because PET is hygroscopic and because moisture causes a hydrolytic decomposition of polymer chains, the material is pre-dried in a most complex process, in particular when material in granular form is involved.

Pre-drying involves introduction of air which is heated electrically or with gas burners in a large-volume insulated reservoir. The material is hereby dehumidified and undergoes a temperature increase. In this single-screw plasticization with pre-drying, energy consumption is significantly increased in relation to the temperature increase of the material, typically to 0.55 kWh/kg. In addition, drying plants require significant installation space, which considerably increases the vertical dimensions of the apparatus for producing injection-molded parts. Reference is made in this context to European Pat. No. EP 0 538 286 B1.

Granular and recycled PET can also be processed undried into films and fibers with a starve fed twin-screw extruder by using suitable processing components and a suitable vacuum extraction. This plasticizing approach without pre-drying, is not applicable however in certain fields, like for example PET preforms, because there are concerns with respect to hydrolytic decomposition and a possible increase of the acetaldehyde content—AA content—in the melt. A low M content, however, is an important performance characteristic of preform facilities, because the overwhelming majority of the produced preforms is used for filling water and CSD—Carbonated Soft Drinks. A high AA content hereby adversely affects the taste of the beverages.

Using a twin-screw extruder for producing PET preforms also poses problems with the synchronization of the cyclic operation of an injection molding machine and the continuously operating twin-screw extruder. It has been observed when using twin-screw compounders in an integrated injection compounder that the combination of these machines requires a reservoir between the extruder and the shot pot.

PET preforms can also be produced with injection molding machines equipped with a single screw as the plasticizing unit. PET is hereby pre-dried over several hours to a residual moisture content of about 20 ppm, then plasticized in the single screw, and injection-molded to preforms. If products containing additives must be processed, these additives must be incorporated in an upstream compounding process.

When producing preforms for milk bottles, juice bottles or similar applications, but also various injection-molded parts, these products must have certain barrier characteristics to prevent the content from changing, for example, due to diffusion of content materials out of the injection-molded parts or intake of substances. Such barrier characteristics can be used, for example, as a protection against photo oxidation, UV light or oxygen exposure. Processing such additives with a single screw extruder is presently not possible at all or only with insufficient quality. Therefore, only products can be processed for an application which involves this incorporation in an upstream compounding step. Even incorporating 50% titanium dioxide—$TiO_2$-PET master batches—for achieving a 10% $TiO_2$ fraction in a milk bottle, as required for adequate $O_2$ barrier characteristics, is not possible because of the insufficient mixing effect of a single-screw extruder. Powdered $TiO_2$ cannot be processed with a single-screw extruder, at least not in the required quantity. Another possibility for protecting the content of such injection-molded parts includes application of a barrier layer in an additional processing step. However, this requires additional facilities which is time consuming and therefore expensive.

It would therefore be desirable and advantageous to provide an improved method for producing injection-molded parts, which obviates prior art shortcomings and is able to specifically produce injection-molded parts with various properties in an energy-saving, space-saving, material-protecting and universally applicable manner.

SUMMARY OF THE INVENTION

According to one aspect of the invention, a method of producing an injection-molded part includes the steps of processing and/or plasticizing a PET material by means of a twin-screw extruder having a plurality of processing zones, wherein at least two of the processing zones are implemented as a degassing zone, transferring the processed and/or plasticized material to a transfer reservoir, and processing the processed and/or plasticized material by a piston unit.

The present invention resolves prior art problems by recognizing the advantages of using a twin-screw extruder with dual vacuum extraction and a suitable processing part for PET plasticizing as well as a combination of the direct plasticizing process with the shot pot of a PET preform injection molding machine via an intermediate component. Thus, injection-molded parts can be produced of particular high quality, without employing a complex pre-drying step. On one hand, energy costs are reduced by eliminating pre-drying. On the other hand, the apparatus can be constructed in a compact form due to the elimination of the drying system, thus allowing a low AA content of the plastic parts. The energy of approximately 0.55 kWh/kg PET required by conventional plants for pre-drying and plasticizing can thus be reduced to about 0.26 kWh/kg PET. Considering that energy consumption represents the second largest cost factor after material consumption in the fabrication of preforms, significant benefits are obtained for the customer.

Conventional apparatuses for producing injection-molded parts, in particular PET preforms, include pre-drying containers which are arranged above the extruder to reduce the placement area and the insulated piping. Thus, installed heights of 12 to 15 m are reached. In contrast thereto, an apparatus for carrying out a method according to the invention has merely a height of only 3 to 4 m, thus allowing production even in multistory buildings. Moreover, the apparatus can be put into operation within several minutes almost without a startup time so that the previously required time-consuming and inconvenient pre-drying step during startup is eliminated.

According to another feature of the present invention, the twin-screw extruder may have five processing zones. Of course, the twin-screw extruder may also have a greater or lesser number of processing zones, depending on the intended application of the apparatus. Suitably, a first one of the processing zones can be constructed to melt the supplied material, preferably to at least 90%. In this zone, the material, in particular pellets, may be heated as quickly and gently as possible to attain a melting of the material.

According to another feature of the present invention, a second and fourth one of the processing zones may be configured as a degassing zone. In the degassing zone, melt may be decompressed and exposed to a first vacuum of, for example, less than 5 mbar, across a large area. In this way, $H_2O$ and decomposition products, such as the AA content, would be mostly extracted, typically to 80%.

According to another feature of the present invention, at least one processing zone, suitably a third one of the processing zones, may be configured as a calming zone. In addition or as alternative, the remaining volatile components of about 20% may be extracted in the fourth processing zone, configured as degassing zone, by an additional vacuum, which is typically smaller than 5 mbar, across a large area. At least one vacuum pump and separation technology may be provided here and may be designed by taking into consideration the extracted oligomers.

According to another feature of the present invention, melt may be compressed in one processing zone, suitably a fifth one of the processing zones. In this way, a pressure buildup zone would be realized in which the degassed melt may be recompressed and subsequently supplied to the transfer reservoir.

According to another feature of the present invention, the twin-screw extruder may be starve fed.

According to another feature of the present invention, the twin-screw extruder may be fed by way of gravimetric metering. Starve feeding the twin-screw extruder may be realized in a particular simple manner by way of the gravimetric metering.

According to another feature of the present invention, the twin-screw extruder has screws which may rotate in a same direction. For simple operation, the twin-screw extruder may be operated continuously. For processing undried material, in particular PET, the twin-screw extruder may be operated with high torque at low rotation speeds.

Moreover, for matching operating modes, a variable, typically hydraulically operated transfer reservoir may advantageously be arranged between the continuous extrusion process and the cyclical injection molding process.

The properties of the material to be processed may be changed by admixing additives in a process zone. These additives may include fillers, for example titanium dioxide—$TiO_2$, talcum, nano-composites or other additives, used to change the material characteristics of the material to be processed, for example to provide protection against photo oxidation. One example for such an additive are oxygen scavengers which improve the barrier characteristic and prevent incursion of oxygen. Such an oxygen scavenger is commercially available under the name Amasorb, for example from the company ColorMatrix. In addition or as alternative, additives may be added which operate, for example, as UV stabilizer, as brightener, or for increasing the viscosity. Color additives may also be conceivable, for example in liquid or master batch form. The addition of polyamide—PA—and/or partially aromatized PA as an aroma barrier would also be possible. Other substances for improving the barrier characteristic are also feasible.

According to another aspect of the invention, a method of producing an injection-molded part includes the steps of processing and/or plasticizing a material by means of a multi-screw extruder having a plurality of processing zones, admixing an additive by a feed unit in at least one of the processing zones, transferring the material to a transfer reservoir, and processing the material in a device.

This extruder may also be constructed as twin-screw extruder. However, advantages are achieved by equipping such injection compounder with multiple, continuously operating screws. For example, there would be no problem with incorporating the additives in the material, for example also in powder form. As additional advantage, it becomes possible to also pre-dry PET or another material instead of PET, for example PP—polypropylene—which is ductile, PEN—polyethylene aphthalate which has excellent barrier characteristics, or combinations—PET/PEN—polyethylene terephthalate/polyethylene aphthalate—or PET/PA—polyethylene terephthalate/polyamide—or PET/EVOH blends—polyethylene terephthalate/ethylene/vinyl alcohol blends—with again good barrier characteristics, as well as also amorphous/partially crystalline recycled substances and flakes, and also PLA—polylactic. In accordance with the present invention, the materials can also be employed in an apparatus which includes degassing, preferably vacuum degassing. As already described above, such pre-drying can be eliminated by providing adequate vacuum degassing. This would result in significant energy savings compared to conventional processing, because the pre-drying step can be eliminated. This is even more significant when processing recycled materials, because a suitable dryer would necessitate approximately 3 times the size as a consequence of the low apparent density of the flakes. These dryers must also be stirred because the flakes have the tendency to stick together during pre-crystallization. As an additional advantage, a plasticizing step may be eliminated entirely.

According to another feature of the present invention, additives, such as fillers, can be metered for processing, if desired, for example in powder form. The fillers can be, e.g., $TiO_2$—titanium dioxide, talcum, nano-composites or similar materials which can be added for protection against different destructive properties, for example photo oxidation. Also conceivable are additives operating as UV stabilizer, as brightener or for increasing the viscosity or for changing other properties. Another possible additive involves oxygen scavengers, e.g., Amasorb from the company ColorMatrix. Also feasible would be the addition of PA—polyamide—or partially aromatized PA as an aroma barrier. Color additives, in liquid form or as master batch, may therefore be metered in a simple manner as an additive. The plasticizing capability of such a machine system is practically unlimited, since it depends only on the rating of the installed motor or on the employed extruder.

More particularly, such apparatus advantageously employs a single-stage fabrication process and is capable to process, for example, powders, but also other components or undried materials, thereby reducing the energy consumption and also costs. Moreover, the polymer is subjected to only a single plasticizing process which in turn exposes the product to little stress. The concept of the invention can be applied, as mentioned above, to other packaging articles and other packaging materials and is therefore not limited to PET preforms.

For a particularly effective pre-drying and/or degassing, one of the processing zones may be configured as degassing zones. In a particularly advantageous manner, at least two processing zones may be constructed as degassing zones, thereby realizing a particularly effective pre-drying. It is of particular advantage, when the admixture of additives provides barrier properties of the processed material.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE shows a schematic illustration of an exemplary embodiment of an apparatus for producing injection-molded parts in accordance with the present invention.

DETAILED DESCRIPTION OF PREFERRED EMBODIMENTS

The depicted embodiment is to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the sole FIGURE, there is shown a schematic illustration of an exemplary embodiment of an apparatus for producing injection-molded parts, in particular PET preforms, in accordance with the invention. The apparatus includes an extruder 1 for processing and plasticizing material in granular form, in this case plastic, and a transfer reservoir 2 for receiving processed and plasticized material as well as a piston unit 3 for subsequent processing of the material. In particular, the combination of the transfer reservoir 2 and the piston unit 3 enables a transformation of the melt produced in continuous form to an injection-molded part.

According to the invention, the extruder 1 is configured as a twin-screw extruder 4 and includes at least two processing zones 6, 8 configured as degassing zones.

The twin-screw extruder 4 has five processing zones 5, 6, 7, 8, 9, wherein the supplied material is melted to at least 90% in the first processing zone 5. In this exemplary embodiment, the material is fed by gravimetric metering 10, which permits starve feeding of the twin-screw extruder 4 in a particularly simple manner.

The second processing zone 6 is implemented as a degassing zone, whereby a first vacuum of about 5 mbar produced by a vacuum pump 11 is applied across a large area. In this way, $H_2O$ and other decomposition products, e.g., AA, are extracted to about 80%.

The combination of the third processing zone 7 and the fourth processing zone 8 as a calming and degassing zone permits additional extraction of volatile components in an amount of about 20%. A vacuum pump is hereby also employed for generating and applying a second vacuum of about 5 mbar. The vacuum pump and the separation technique are designed by taking into consideration the extracted oligomers.

In this exemplary embodiment, the twin-screw extruder 4 operates continuously and in the same rotation direction, whereby the twin-screw extruder 4 is operated with a high torque at a low rotation speed. The melted material is injected with the piston unit 3 into the preform molding tool, as described above.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method of producing an injection-molded part, comprising the steps of:
    processing and/or plasticizing a PET material by means of a twin-screw extruder having a plurality of processing zones, wherein at least two of the processing zones are implemented as a degassing zone, separated by a calming zone to thereby dry the PET material;
    transferring the processed and/or plasticized material to a transfer reservoir; and
    processing the processed and/or plasticized material by a piston unit.

2. The method of claim 1, wherein the injection-molded part is a PET preform.

3. The method of claim 1, wherein the material has a granular form.

4. The method of claim 1, wherein the twin-screw extruder has five processing zones.

5. The method of claim 1, wherein the processed and/or plasticized material is melted in one of the processing zones.

6. The method of claim 1, wherein the plurality of processing zones are placed sequentially to define a first processing and a last processing zone, and further comprising the step of melting the processed and/or plasticized material in the first processing zone to produce a melt.

7. The method of claim 6, wherein at least 90% of the material is melted in the first processing zone.

8. The method of claim 6, wherein the at least two degassing zones are a second and a fourth one of the processing zones.

9. The method of claim 1, wherein the melt is decompressed and exposed to a first vacuum of less than 5 mbar to extract $H_2O$ and decomposition products in each of the degassing zones.

10. The method of claim 8, wherein remaining volatile components are extracted in the fourth processing zones.

11. The method of claim 5, further comprising the step of compressing the melt in one of the processing zones.

12. The method of claim 6, further comprising the step of compressing the melt in a fifth one of the processing zones.

13. The method of claim 1, wherein the twin-screw extruder is starve fed.

14. The method of claim 1, wherein the twin-screw extruder is fed by way of gravimetric metering.

15. The method of claim 1, wherein the twin-screw extruder has two screws rotating in a same direction.

16. The method of claim 1, further comprising the step of operating the twin-screw extruder with high torque at low rotation speed.

17. The method of claim 1, further comprising the step of admixing an additive by a feed unit in at least one of the processing zones.

18. The method of claim 1, further comprising the step of operating the twin-screw extruder continuously.

19. The method of claim 17, wherein the additive is at least one member selected from the group consisting of filler, oxygen scavenger, UV stabilizer, brightener, increaser or viscosity, color additive, polyamide, and aromatized polyamide.

* * * * *